Feb. 3, 1948.                M. R. WEISSMAN                2,435,374
                            VARIABLE CONDENSER
                            Filed July 25, 1946
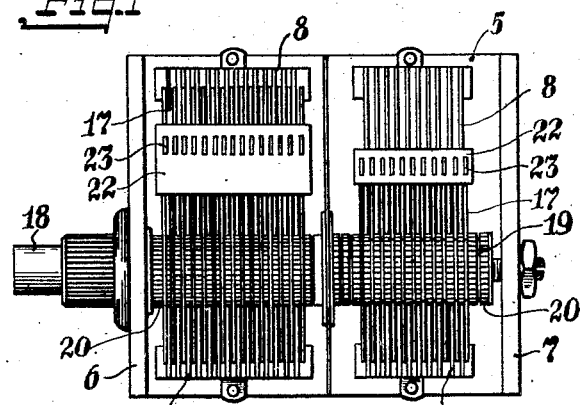
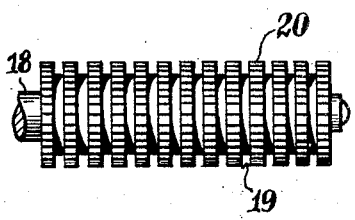
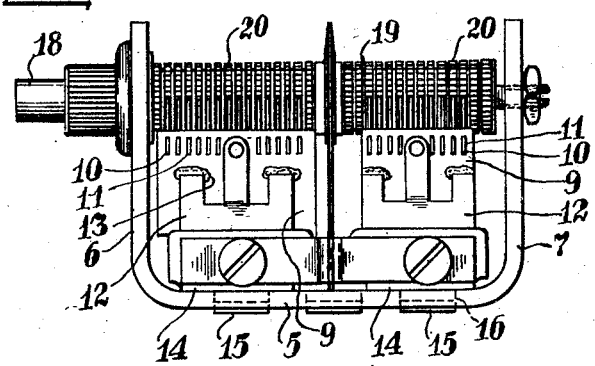
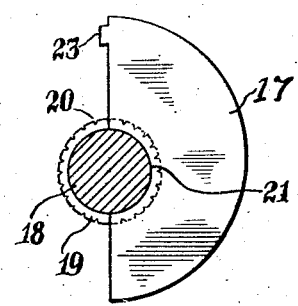
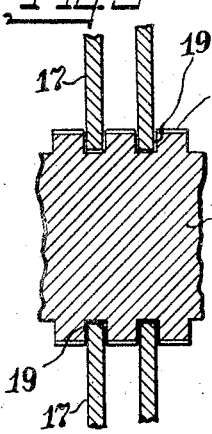
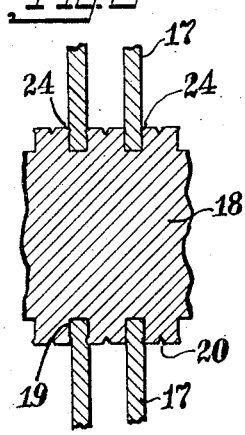
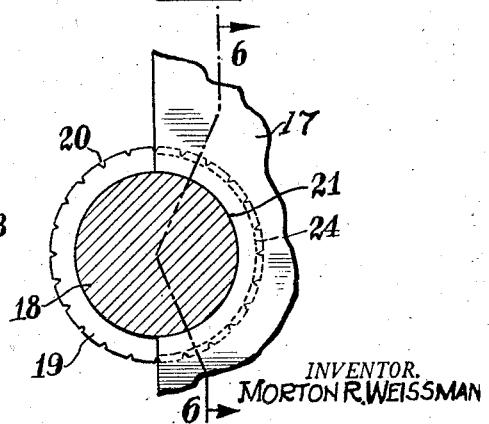
INVENTOR.
MORTON R. WEISSMAN
BY
Edw. S. Higgins
Attorney Patented Feb. 3, 1948

2,435,374

UNITED STATES PATENT OFFICE 2,435,374

VARIABLE CONDENSER

Morton R. Weissman, West New York, N. J.

Application July 25, 1946, Serial No. 686,184

1 Claim. (Cl. 287—52)

This invention relates generally to variable condensers and more particularly to improved rotor units or variable condensers.

A primary object of my invention is to provide an improved means of mounting rotor plates on a supporting shaft in a variable condenser by which a solid rotor construction may be obtained and the rotor plates secured against angular displacement or looseness which may cause inaccuracies in the capacity of the condenser and cause microphonic disturbances.

Another object of my invention is to provide a construction of mounting for the rotor plates of a variable condenser wherein a number of plates may be mounted in spaced parallel planes and maintained against displacement by wedging the material of the suporting means adjacent the base of the rotor plates.

A specific object of my invention is to provide a rotor plate supporting shaft with a knurled surface whereby the material of the surface becomes more pliable and when struck by a tool readily flows and becomes deformed for locking the plates in parallel planes positively spaced with respect to a set of stator plates.

The invention will be better understood from the description thereof to follow taken in connection with the accompanying drawing in which—

Figure 1 is a to plan view of a condenser embodying the invention.

Figure 2 is a front view thereof.

Figure 3 is a detail view of the shaft on an enlarged scale.

Figure 4 is a cross-sectional view of the shaft with a rotor plate in position thereon.

Fig. 5 is an enlarged fragmentary longitudinal sectional view of the shaft of Fig. 3 with two adjacent rotor plates positioned loosely thereon before being secured to the shaft.

Fig. 6 is a view similar to Fig. 5 but showing the rotor plates secured in position, the view being taken on the plane of the line 6—6 of Fig 7.

Fig. 7 is an enlarged end view of the parts of Fig. 6.

Referring more particularly to the drawings, the condenser includes a frame or chassis having a base portion 5 and end walls 6 and 7.

The stator group of plates 8 of each unit of the condenser is attached to tie bars 9 at each side of the frame in any suitable manner, such for example by staking over the tines 10 on the plates which pass through slots 11 in the bars. The tie bars are fastened to brackets 12 by means of solder 13 and the brackets are supported on vertically disposed insulators 14 having reduced portions 15 extending through slots 16 in the base of the frame and suitably fastened to the base.

The rotor plates 17 of each unit of the condenser are carried on a shaft 18 which is journalled in the end walls 6 and 7. An important feature of the present invention is the novel means for securing the rotor plates to the shaft to prevent displacement or disalignment of said plates and to space them properly from each other. This is accomplished by providing annular grooves 19 in the surface of the shaft and knurling the surface between said grooves as indicated at 20 to make such surface more pliable.

Each rotor plate is cut away at one side thereof as indicated at 21 in a substantially semi-circular cut as shown. The grooves of the shaft are initially slightly wider throughout than the thickness of the thickest plate that is apt to be employed in the construction of the condenser, and the arc of the cut-away portion of the plate is initially slightly larger than the arc of the groove of the shaft.

When the rotor plates are all in position in their respective grooves of the shaft, pressure is applied by a tool to the plates whereby the arc of each plate is shortened so that the end edges of the cut-away portion of the plate are nipped against the base of the groove of the shaft thereby holding such plates in position on the shaft. While the plates are thus held on the shaft, pressure is applied by a tool to the knurled surface of the shaft to simultaneously spread and force the material of the shaft between the grooves adjacent the cut-away portions of the plates into biting engagement with the plates thereby solidly locking the rotor plates in the grooves of the shaft. At the same time, an insulating strip 22 is secured to the outer edges of the plates by staking over the tines 23 on the edges of the plates which pass through slots in said strip thereby locking the plates in spaced relationship. This operation due to the pliability of the surface material caused by knurling tends to cause the surface material of the shaft to flow over the opposed edges of the grooves and thereby narrow the grooves and dense the material at such points around the plates as shown at 24 in Fig. 6 for effecting a locking of the rotor plates on the shaft.

I have found that by knurling the surface of the shaft, the surface material of the shaft becomes more pliable and deformable and readily spreads or flows when struck by a tool thereby facilitating wedging and clinching of the rotor plates on the shaft. The plates and shaft become practically integral with each other making it impossible for the plates to become loose thereby entirely eliminating microphonic disturbances. This novel feature also permits the use of plates of various thicknesses.

I claim:

In a support for the rotor plates of a variable condenser, a rotary shaft having a plurality of spaced annular grooves, rotor plates in said grooves secured between the walls thereof and means to facilitate swaging of the shaft between the plates in the grooves comprising knurled surfaces on said shaft.

MORTON R. WEISSMAN.

REFERENCES CITED

The following references are of record in the file of this patent:

UNITED STATES PATENTS

| Number | Name | Date |
| --- | --- | --- |
| 1,591,317 | Jacobson | July 6, 1926 |
| 2,394,686 | Hammond | Feb. 12, 1946 |